Feb. 24, 1931.  E. SOYEZ  1,794,344
DISPENSING RECEPTACLE
Filed Sept. 10, 1928
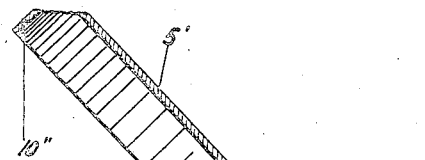
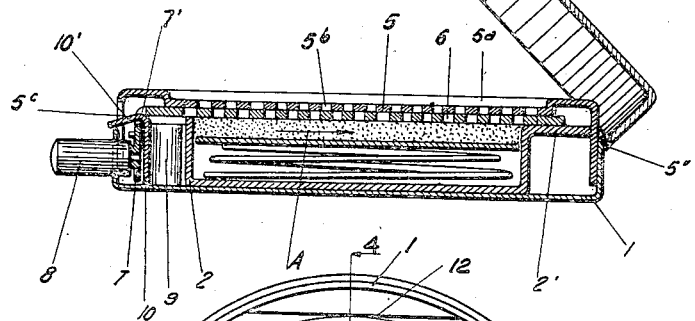
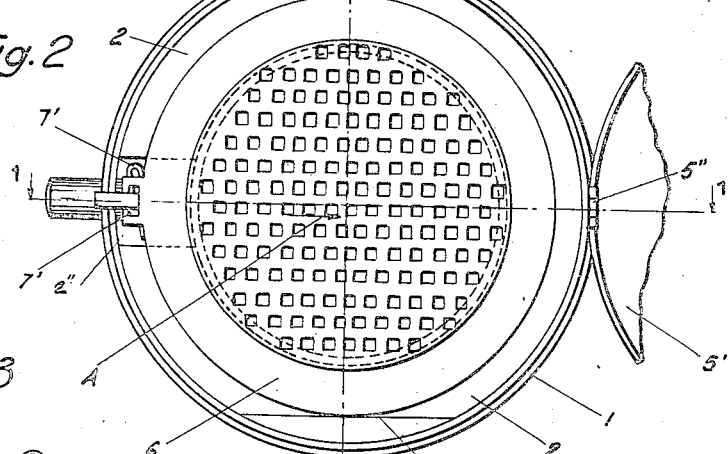
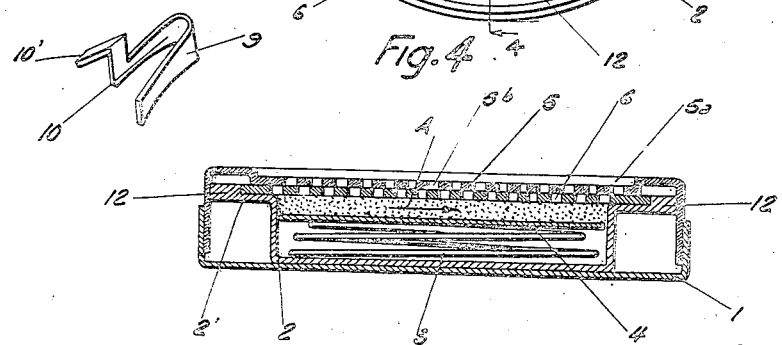
Inventor
Emile Soyez
By Addison A. Armstrong
Attorney Patented Feb. 24, 1931

1,794,344

UNITED STATES PATENT OFFICE

EMILE SOYEZ, OF PARIS, FRANCE

DISPENSING RECEPTACLE

Application filed September 10, 1928, Serial No. 305,104, and in France May 25, 1928.

My invention relates to improvements in dispensing receptacles and more particularly to receptacles known as vanity cases in which face powder or analogous substances are dispensed in small quantities at a time.

Devices are known in the art in which a movable reciprocable grid forces the material through a foraminous dispensing plate by means of scoops provided thereon. Devices are also known in which such grid is controlled by opening of the cover of the device. In other devices the receptacle is tapped upon such as with the powder puff on the foraminous dispensing plate to work the powder up through such plate.

The general object of my invention is to simplify such devices and provided a manually reciprocable grid which is displaced against the action of a spring simply by pushing on a push button projecting through the side of the receptacle, the reciprocation of the grid allowing the powder to pass therethrough by independent resilient means and hence through a foraminous dispensing plate beneath which the grid is slidably mounted.

Other objects of my invention reside in certain novel forms, construction and arrangement of the parts the objects of which are to provide reliable devices for the purposes stated all of which will be fully described and claimed hereinafter.

In the drawing—

Fig. 1 is a section taken on the line 1—1 of Fig. 2 illustrating my improved distributer;

Fig. 2 is a plan view thereof with the foraminous dispensing plate removed and the cover shown partially in full open position;

Fig. 3 is a perspective detail view of a spring; and

Fig. 4 is a section along the line 4—4 of Fig. 2.

Referring to the drawing more in detail, I provide a case 1 in which is disposed a container 2 provided with a flange 2'. The said flange is cut away to form a notch 2" for a purpose which will be subsequently pointed out. Within the container 2 is disposed a coil spring 3 upon which rests a circular plate 4 adapted to engage the member 2 with a sliding fit. A dispensing plate generally indicated by 5 is adapted to fit within the member 1 and embrace the periphery of the flange 2' of member 2. The said dispensing plate comprises a circular flanged member in which is provided a central recess $5^a$ having a foraminous bottom $5^b$ through which the powder is forced into the recess $5^a$ for dispensing.

The case member 1 is provided with a cover 5' for closing the device when not in use and secured to the member 1 by means of a hinge 5".

I dispose a foraminous plate which I term a grid as shown at 6. In assembling the grid 6 is laid upon the flange 2' of member 2 and the member 5 fitted over the member 2 so that the said grid is slidably held between the members 2 and 5. The whole is then inserted in the case 1 and becomes centered by engagement of the side of member 5 in the member 1. The grid 6 is provided with a tongue 7 extending downward at right angles thereto and care is taken in assembling that said tongue falls within the notch 2" of flange 2' so that the grid 6 may be free to be displaced laterally between the members 2 and 5.

Secured to the tongue 7 is a push button 8 which projects through the case member 1. The member 5 is provided with a notch $5^c$ so that it may be readily removed from the member 2 without interfering with the push button 8.

A leaf spring generally indicated at 9 comprising a U-shaped portion 10, at one end of which is provided a catch lug 10', is disposed between the body portion of member 2 and the tongue 7. The member 5 is provided with a slot adjacent the tongue 7 through which extends the catch lug 10'. The catch lug 10' is adapted to engage a notch 10" provided within the cover 5' for releasably retaining said cover in closed position.

The perforations of members 5 and 6 are so disposed that when said member 6 is moved to its normal extreme position to the left as shown in Fig. 1 under the action of the spring 9, the said perforations will be mutually closed by the solid portions of members 5 and 6.

In order that the grid 6 may not be free to move transversely to the line of travel thereof under the action of push button 8, I provide the flange 2' with two diametrically disposed integral guides 12 (Figs. 2 and 4) consisting of projections forming tangent bearing surfaces for the circular grid 6.

In using my device it will be obvious from the foregoing that the material to be dispensed is placed on the disk 4 and the member 2 placed within the case 1. The spring 9 is put in place with the lug 10' extending through the slot 7'. The grid 6 is then placed on the member 2 whose notch 2'' in flange 2' allows insertion of push button 8 so that the same projects beyond the case 1. The dispensing plate 5 is then inserted between the member 2 and the member 1 so that it lightly bears on the grid 6.

If the push button 8 be pushed upon the perforations of members 5 and 6 will be caused to align and the spring pressed disk 4 causes a small amount of powder to work its way up through said perforations into the recess 5$^a$ where it is ready for consumption in the usual manner such as by dipping a powder puff therein. As soon as the push button 8 has been released the spring 9 acting on the tongue 7 returns the grid 6 to its original position in which the perforations of members 5 and 6 are again closed. By pushing on the member 8 several times any amount of powder desired may be worked into the recess 5$^a$ of the dispensing plate 5.

It is to be noted that the container 2, grid 6, spring 9 and dispensing plate 5 may be assembled as a unit when filling if preferred, as the notch 2'' in flange 2' allows the push button 8 to be readily inserted with these members in assembled position before insertion into the case 1.

It will also be noted that when the cover 5' is closed on the case member 1, it is releasably held in closed position by means of the catch lug 10' engaging the notch 10''. Thus when the device is closed and it is desired to use the same it is necessary to push on the push button 8 to release the cover 5'. There is therefore always assured a supply of powder on the dispensing plate 5 each time the cover 5 is opened and there is material on the disk 4.

I thus provide a device which is simple in operation and due to the minimum number of parts one which is very cheap to manufacture, but at the same time, most effective in operation.

While I have disclosed what I deem to be the preferred form of my device I do not wish to be limited thereto as many variations might be resorted to by those skilled in the art concerning the construction and dispositions of the various elements without departing from the spirit of my invention as comprehended within the scope of the appended claims.

I claim:

1. In a dispensing receptacle of the type described, the combination of a two part hinged case, a perforate dispensing cover fitted in one of said parts, a powder receptacle disposed beneath said cover in spaced relation thereto, a perforate grid slidably mounted between said powder receptacle and said cover, spring means in said receptacle adapted to force the contents therein against said grid, manually operable means projecting outside said case carried by said grid and spring means adapted to oppose rectilinear displacement of said grid by said manually operable means.

2. In a dispensing receptacle of the type described, the combination of a two part hinged case, a perforate dispensing cover fitted in one of said parts, a powder receptacle disposed beneath said cover in spaced relation thereto, a perforate grid slidably mounted between said powder receptacle and said cover, spring means in said receptacle adapted to force the contents therein against said grid, manually operable means projecting outside said case carried by said grid, spring means adapted to oppose rectilinear displacement of said grid by said manually operable means, and means on said powder receptacle for guiding said grid in the direction of movement thereof.

3. In a dispensing receptacle of the type described, the combination of a two part hinged case, a perforate dispensing cover fitted in one of said parts, a powder receptacle disposed beneath said cover in spaced relation thereto, a perforate grid slidably mounted between said powder receptacle and said cover, spring means in said receptacle adapted to force the contents therein against said grid, a tongue on said grid extending between said case and said powder receptacle, a push-button secured to said tongue adapted to project outside said case, and a leaf spring disposed between said tongue and said powder receptacle adapted to oppose rectilinear motion of said grid by said push-button.

4. In a dispensing receptacle of the type described, the combination of a two part hinged case, a perforate dispensing cover fitted in one of said parts, a powder receptacle disposed beneath said cover in spaced relation thereto, a perforate grid slidably mounted between said powder receptacle and said cover, spring means in said receptacle adapted to force the contents therein against said grid, a tongue on said grid extending between said case and said powder receptacle, a push-button secured to said tongue adapted to project outside said case, a leaf spring disposed between said tongue and said powder receptacle adapted to oppose rectilinear motion of said grid by said push-button, and means on said powder receptacle for guiding said grid in the direction of movement thereof.

5. In a dispensing receptacle of the type described, the combination of a two part hinged case, a perforate dispensing cover fitted in one of said parts, a powder receptacle disposed beneath said cover in spaced relation thereto, a perforate grid slidably mounted between said powder receptacle and said cover, spring means in said receptacle adapted to force the contents therein against said grid, manually operable means projecting outside said case carried by said grid, spring means adapted to oppose rectilinear displacement of said grid by said manually operable means, and means for latching said case parts together adapted to be released by the displacement of said manually operable means.

6. In a dispensing receptacle of the type described, the combination of a two part hinged case, a perforate dispensing cover fitted in one of said parts, a powder receptacle disposed beneath said cover in spaced relation thereto, a perforate grid slidably mounted between said powder receptacle and said cover, spring means in said receptacle adapted to force the contents therein against said grid, manually operable means projecting outside said case carried by said grid, spring means adapted to oppose rectilinear displacement of said grid by said manually operable means, means on said powder receptacle for guiding said grid in the direction of movement thereof, and means for latching said case parts together adapted to be released by the displacement of said manually operable means.

7. In a dispensing receptacle of the type described, the combination of a two part hinged case, a perforate dispensing cover fitted in one of said parts, a powder receptacle disposed beneath said cover in spaced relation thereto, a perforate grid slidably mounted between said powder receptacle and said cover, spring means in said receptacle adapted to force the contents therein against said grid, a tongue on said grid extending between said case and said powder receptacle, a push-button secured to said tongue adapted to project outside said case, a leaf spring disposed between said tongue and said powder receptacle adapted to oppose rectilinear motion of said grid by said push-button, and means for latching said case parts together adapted to be released by the displacement of said push-button.

8. In a dispensing receptacle of the type described, the combination of a two part hinged case, a perforate dispensing cover fitted in one of said parts, a powder receptacle disposed beneath said cover in spaced relation thereto, a perforate grid slidably mounted between said powder receptacle and said cover, spring means in said receptacle adapted to force the contents therein against said grid, a tongue on said grid extending between said case and said powder receptacle, a push-button secured to said tongue adapted to project outside said case, a leaf spring disposed between said tongue and said powder receptacle adapted to oppose rectilinear motion of said grid by said push-button, means on said powder receptacle for guiding said grid in the direction of movement thereof and means for latching said case parts together adapted to be released by the displacement of said push-button.

9. In a dispensing receptacle of the type described, the combination of a two part hinged case, a perforate dispensing cover fitted in one of said parts, a powder receptacle disposed beneath said cover in spaced relation thereto, a perforate grid slidably mounted between said powder receptacle and said cover, spring means in said receptacle adapted to force the contents therein against said grid, a tongue on said grid extending between said case and said powder receptacle, a pushbutton secured to said tongue adapted to project outside said case, a leaf spring disposed between said tongue and said powder receptacle adapted to oppose rectilinear motion of said grid by said push-button, an abutting plate for said tongue carried by said spring, and a latching lug on said plate extending through said tongue adapted to hold the other of said case members in closed position when said push-button is released.

10. In a dispensing receptacle of the type described, the combination of a two part hinged case, a perforate dispensing cover fitted in one of said parts, a powder receptacle disposed beneath said cover in spaced relation thereto, a perforate grid slidably mounted between said powder receptacle and said cover, spring means in said receptacle adapted to force the contents therein against said grid, a tongue on said grid extending between said case and said powder receptacle, a push-button secured to said tongue adapted to project outside said case, a leaf spring disposed between said tongue and said powder receptacle adapted to oppose rectilinear motion of said grid by said push-button, means on said powder receptacle for guiding said grid in the direction of movement thereof, an abutting plate for said tongue carried by said spring, and a latching lug on said plate extending through said tongue adapted to hold the other of said case members in closed position when said push-button is released.

In testimony whereof I hereunto affix my signature.

EMILE SOYEZ.